United States Patent
Wang et al.

(10) Patent No.: US 8,897,547 B2
(45) Date of Patent: Nov. 25, 2014

(54) PRECISION IMPROVING DEVICE FOR THREE DIMENSIONAL TOPOGRAPHICAL DATA, PRECISION IMPROVING METHOD FOR THREE DIMENSIONAL TOPOGRAPHICAL DATA AND RECORDING MEDIUM

(75) Inventors: Jing Wang, Osaka (JP); Hirokazu Koizumi, Osaka (JP); Toshiyuki Kamiya, Osaka (JP)

(73) Assignee: NEC Solution Innovators, Ltd., Tokyo (JP)

( * ) Notice: Subject to any disclaimer, the term of this patent is extended or adjusted under 35 U.S.C. 154(b) by 276 days.

(21) Appl. No.: 13/641,166
(22) PCT Filed: Apr. 14, 2011
(86) PCT No.: PCT/JP2011/059303
§ 371 (c)(1),
(2), (4) Date: Oct. 15, 2012
(87) PCT Pub. No.: WO2011/129409
PCT Pub. Date: Oct. 20, 2011

(65) Prior Publication Data
US 2013/0039578 A1    Feb. 14, 2013

(30) Foreign Application Priority Data
Apr. 14, 2010  (JP) ................ 2010-092773

(51) Int. Cl.
| | | |
|---|---|---|
| G06K 9/00 | (2006.01) | |
| G01C 11/06 | (2006.01) | |
| G01C 11/28 | (2006.01) | |
| G06T 17/05 | (2011.01) | |
| G06T 5/00 | (2006.01) | |
| G06T 5/50 | (2006.01) | |
| G06T 7/00 | (2006.01) | |

(52) U.S. Cl.
CPC ........... *G01C 11/06* (2013.01); *G01C 11/28* (2013.01); *G06T 17/05* (2013.01); *G06T 5/002* (2013.01); *G06T 5/50* (2013.01); *G06T 7/0081* (2013.01); *G06T 7/0097* (2013.01); *G06T 2200/04* (2013.01); *G06T 2207/10012* (2013.01); *G06T 2207/30181* (2013.01)
USPC ........... 382/154; 382/106; 382/173; 382/199; 382/275; 345/419; 348/42; 348/48

(58) Field of Classification Search
USPC .......... 382/106, 154, 173, 199, 275; 345/419; 348/42, 48
See application file for complete search history.

(56) References Cited

U.S. PATENT DOCUMENTS

| | | | |
|---|---|---|---|
| 6,373,518 B1 | 4/2002 | Sogawa | |
| 6,970,593 B2 * | 11/2005 | Furukawa | ............. 382/154 |

(Continued)

FOREIGN PATENT DOCUMENTS

| | | |
|---|---|---|
| JP | 8-016930 A | 7/1991 |
| JP | 11-325889 A | 11/1999 |

(Continued)

*Primary Examiner* — Chan Park
*Assistant Examiner* — Eueng-Nan Yeh
(74) *Attorney, Agent, or Firm* — Sughrue Mion, PLLC

(57) ABSTRACT

A three-dimensional topographical data precision improving device (10) removing noise that occurs in water regions of three-dimensional topographical data comprises a water region specifying unit (13) specifying the range of any one water region; a feature extraction unit (14) extracting feature values within any one water region that describe altitude distribution pattern of each local region in the three-dimensional topographical data; a segmentation unit (15) segmenting the whole range into candidate water regions and non-water regions by comparing the feature values of the specified water region with those of each point in the three-dimensional topographical data; a water region extraction unit (16) extracting water regions from the candidate water regions; and a plane creation unit (17) creating a corrected plane of each water region using the altitudes of the surrounding non-water regions and replacing the water region extracted by the water region extraction unit (16) with the corrected plane.

8 Claims, 7 Drawing Sheets

(56) References Cited

U.S. PATENT DOCUMENTS 7,149,346 B2 * 12/2006 Oniyama .................. 382/154
7,386,164 B2 * 6/2008 Shragai et al. ............ 382/154

FOREIGN PATENT DOCUMENTS

| | | |
|---|---|---|
| JP | 2003-288581 A | 10/2003 |
| JP | 2005-148906 A | 6/2005 |

* cited by examiner

PRECISION IMPROVING DEVICE FOR THREE DIMENSIONAL TOPOGRAPHICAL DATA, PRECISION IMPROVING METHOD FOR THREE DIMENSIONAL TOPOGRAPHICAL DATA AND RECORDING MEDIUM

CROSS REFERENCE TO RELATED APPLICATIONS

This application is a National Stage of International Application No. PCT/JP2011/059303 filed Apr. 14, 2011, claiming priority based on Japanese Patent Application No. 2010-092773, filed Apr. 14, 2010, the contents of all of which are incorporated herein by reference in their entirety.

TECHNICAL FIELD

The present invention relates to a three-dimensional topographic data precision improving device, three-dimensional topographic data precision improving method, and recording medium for removing noise that occurs in water regions of three-dimensional topographical data as a result of stereo matching errors in three-dimensional information calculation.

BACKGROUND ART

Techniques for creating three-dimensional topographical data using a set of two stereoscopic photographs of the same spot taken from different viewpoints are known (for example, Patent Literature 1). More specifically, in such techniques, firstly, for each point in one photograph, its corresponding point presenting the same ground point is searched for in the other photograph of the stereoscopic pair. Then, the altitude of the point (altitude information) is calculated based on the parallax between the point in the first photograph and its corresponding point in the second photograph of the stereoscopic pair. The altitude (altitude information) is calculated for every point to create three-dimensional topographical data of the whole overlapping area shown in the stereoscopic pair.

Here, the corresponding point is searched for using, for example, the area correlation method in which for a point in one photograph, a point in the other photograph of the stereoscopic pair is identified as the corresponding point when their similarity level in terms of the surrounding luminance distribution and/or surrounding color distribution is equal to or higher than a given value.

PRIOR ART LITERATURE

Patent Literature

Patent Literature 1: Examined Japanese Patent Application Kokoku Publication No. H8-16930.

SUMMARY OF INVENTION

Problems to be Solved by the Invention

With the above techniques of creating three-dimensional topographical data, the correct corresponding point to a feature point on the ground that is with some spatial luminance variation and/or color variation in its surroundings, for example an end of a white line at a pedestrian crossing, can be extracted from the other photograph using, for example, the area correlation based stereo matching method.

However, water regions such as oceans, lakes, ponds, and rivers have certain particular texture on the water surface; which leads to the cases that the correct corresponding point to a point on a water surface sometimes cannot be extracted. This is because every local region within a water region has quite similar spatial luminance and/or color variation pattern. For example based on the area correlation method, for one point in one photograph, one or more points in the other photograph are with the similarity level equal to or higher than the given threshold in terms of the surrounding spatial luminance profile and/or surrounding color distribution. Thus, it is not guaranteed that the exact corresponding point is correctly extracted.

For that reason, the wrong parallax and altitude are acquired in the subsequent processing. This is called stereo matching errors upon the above-described three-dimensional information calculation. Consequently, there exists altitude noise in water regions of the three-dimensional topographical data.

The purpose of the present invention is to improve the precision of three-dimensional topographical data by removing noise that occurs in water regions of the three-dimensional topographical data.

Means for Solving the Problems

In order to achieve the above purpose, the three-dimensional topographical data precision improving device according to a first exemplary aspect of the present invention is:

a three-dimensional topographical data precision improving device removing noise that occurs in water regions of three-dimensional topographical data as a result of stereo matching errors upon three-dimensional information calculation in three-dimensional topographical data established from stereoscopic photographs, comprising:

a determination unit determining whether there are any water regions in the input three-dimensional topographical data;

a water region specifying unit specifying the range of any one water region;

a feature extraction unit extracting feature values within the specified one water region by extracting feature values describing the altitude distribution pattern of each local region over the whole range of the three-dimensional topographical data;

a segmentation unit segmenting the points in the three-dimensional topographical data into candidate water regions and non-water regions by using the extracted feature values within the specified water region as a water region determination reference value, comparing the feature values of each point in the three-dimensional topographical data with the water region determination reference value, and determining that the point belongs to the candidate water region if the difference is equal to or smaller than a given threshold, and otherwise determining that the point belongs to the non-water region;

a water region extraction unit extracting a connected component having the same or wider area than a given threshold among the candidate water regions as a water region based on the results of the segmentation unit; and a plane creation unit creating a corrected plane joined to the boundary of each water region extracted by the water region extraction unit using the altitudes of the surrounding non-water regions adjoining to the water region extracted by the water region extraction unit, and replacing the water region extracted by the water region extraction unit with the corrected plane.

In order to achieve the above purpose, the three-dimensional topographical data precision improving method according to a second exemplary aspect of the present invention is:

a three-dimensional topographical data precision improving method removing noise that occurs in water regions of three-dimensional topographical data as a result of stereo matching errors upon three-dimensional information calculation in three-dimensional topographical data established from stereoscopic photographs, comprising:

a determination step of determining whether there are any water regions in the input three-dimensional topographical data;

a water region specifying step of specifying the range of any one water region;

a feature extraction step of extracting feature values within the specified one water region by extracting feature values describing the altitude distribution pattern of each local region over the whole range of the three-dimensional topographical data;

a segmentation step of segmenting the points in the three-dimensional topographical data into candidate water regions and non-water regions by using the extracted feature values within the specified water region as a water region determination reference value, comparing the feature values of each point in the three-dimensional topographical data with the water region determination reference value, and determining that the point belongs to the candidate water region if the difference is equal to or smaller than a given threshold, and otherwise determining that the point belongs to the non-water region;

a water region extraction step of extracting a connected component having the same or wider area than a given threshold among the candidate water regions as a water region based on the results in the segmentation step; and a plane creation step of creating a corrected plane joined to the boundary of each water region extracted in the water region extraction step using the altitudes of the surrounding non-water regions adjoining to the water region extracted in the water region extraction step, and replacing the water region extracted in the water region extraction step with the corrected plane.

In order to achieve the above purpose, the computer-readable recording medium on which a program is recorded according to a third exemplary aspect of the present invention records a program allowing a computer removing noise that occurs in water regions of three-dimensional topographical data as a result of stereo matching errors upon three-dimensional information calculation in three-dimensional topographical data established from stereoscopic photographs to function as:

a determination unit determining whether there are any water regions in the input three-dimensional topographical data;

a water region specifying unit specifying the range of any one water region;

a feature extraction unit extracting feature values within the specified one water region by extracting feature values describing the altitude distribution pattern of each local region over the whole range of the three-dimensional topographical data;

a segmentation unit segmenting the points in the three-dimensional topographical data into candidate water regions and non-water regions by using the extracted feature values within the specified water region as a water region determination reference value, comparing the feature values of each point in the three-dimensional topographical data with the water region determination reference value, and determining that the point belongs to the candidate water region if the difference is equal to or smaller than a given threshold, and otherwise determining that the point belongs to the non-water region;

a water region extraction unit extracting a connected component having the same or wider area than a given threshold among the candidate water regions as a water region based on the results of the segmentation unit; and a plane creation unit creating a corrected plane joined to the boundary of each water region extracted by the water region extraction unit using the altitudes of the surrounding non-water regions adjoining to the water region extracted by the water region extraction unit, and replacing the water region extracted by the water region extraction unit with the corrected plane.

Effect of the Invention

The present invention can create highly precise three-dimensional topographical data by extracting water regions containing significant noise in three-dimensional topographical data constructed from stereoscopic photographs and replacing noisy water regions with smooth planes.

BRIEF DESCRIPTION OF DRAWINGS

FIG. 4A shows the results of extracting the connected components consisting of points belonging to candidate water regions and FIG. 4B shows the results of removing small connected components of candidate water regions whose area is under certain given threshold and also removing small non-water regions within the remaining connected components of candidate water regions shown in FIG. 4A;

BEST MODE FOR CARRYING OUT THE INVENTION

Figure 1:
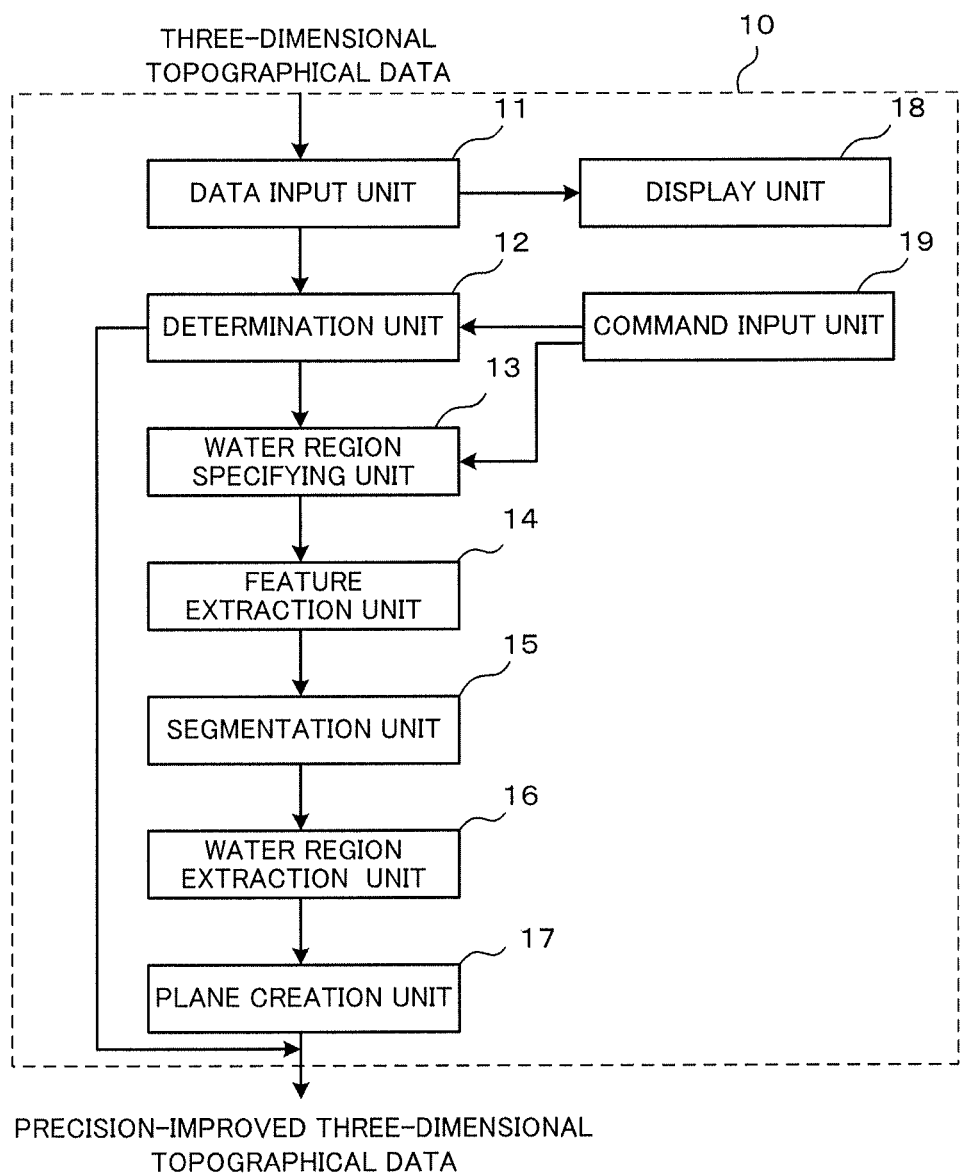
FIG. 1 is a block diagram showing the three-dimensional topological data precision improving device according to an embodiment of the present invention.

An embodiment of the present invention will be described in detail hereafter based on the drawings.

A three-dimensional topographical data precision improving device 10 according to this embodiment comprises a data input unit 11, a determination unit 12, a water region specifying unit 13, a feature extraction unit 14, a segmentation unit 15, a water region extraction unit 16, a plane creation unit 17, a display unit 18 consisting of a display or the like, and a command input unit 19 consisting of a mouse and/or keyboard.

The data input unit 11 receives three-dimensional topographical data entered from an external device. The three-dimensional topographical data are output data of a software creating three-dimensional topographical data from stereoscopic aerial photographs, for example, by means of a stereo matching technique.

Figure 2:
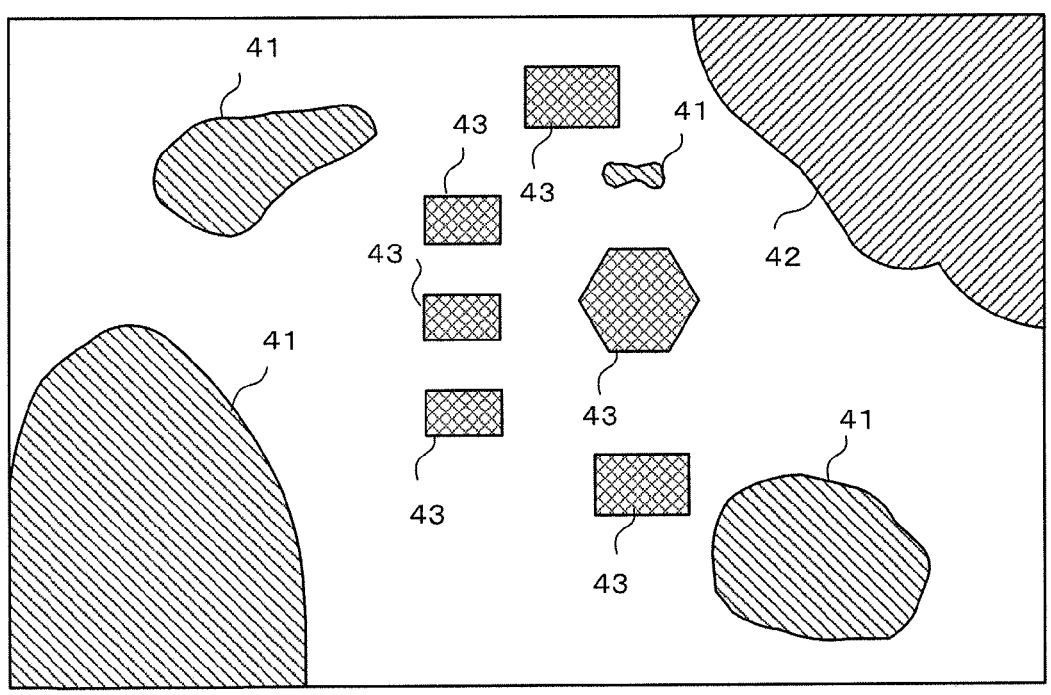
FIG. 2 is an exemplary illustration showing three-dimensional topological data.

FIG. 2 is an exemplary illustration showing three-dimensional topographical data. The three-dimensional topographical data shown in FIG. 2 contain multiple isolated water regions 41, a mountainous region 42, and architectural structures 43 such as buildings and houses. The three-dimensional topographical data are entered from the data input unit 11 and displayed on the display unit 18. With the three-dimensional topographical data being displayed on the display unit 18, the user knows whether any water regions 41 are contained in the three-dimensional topographical data. If any water regions 41 are contained in the three-dimensional topographical data, the user conducts input operation indicating that the water regions 41 are contained in the three-dimensional topographical data through the command input unit 19. Then, the determination unit 12 shown in FIG. 1 determines that there are some water regions 41 in the three-dimensional topographical data.

Conversely, if no water region 41 is contained in the three-dimensional topographical data, the user conducts input operation indicating that no water region 41 is contained in the three-dimensional topographical data through the command input unit 19. Then, the determination unit 12 determines that there is no water region 41 in the three-dimensional topographical data.

Instead of the user conducting input operation indicating the presence/absence of water regions 41, the determination unit 12 may determine whether any water regions 41 are contained in the three-dimensional topographical data from features of the three-dimensional topographical data.

Returning to FIG. 1, in the water region specifying unit 13 the range of a water region 41 is specified by the user on the three-dimensional topographical data entered from the data input unit 11. The range of any one water region 41 on the three-dimensional topographical data specified by the user is displayed on the display unit 18.

Figure 3A:
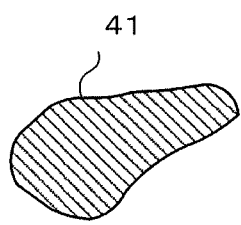
FIGS. 3A and 3B are illustrations showing methods of specifying the range of a water region.
Figure 3B:
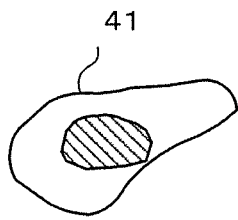

Here, in the water region specifying unit 13 the user may specify the entire inner region of a water region 41 along the boundary of the water region 41 as shown in FIG. 3A, or specify a partial inner region of the water region 41 as shown in FIG. 3B.

The feature extraction unit 14 extracts feature values of a water region 41 specified by the water region specifying unit 13 based on the altitude distribution pattern in this region of the three-dimensional topographical data, and sends the extracted feature values to the segmentation unit 15.

More specifically, the feature extraction unit 14 extracts feature values presenting the altitude distribution pattern of each part in the three-dimensional topographical data. In the three-dimensional topographical data, the water regions 41 containing noise have a particular texture pattern different from that of other smoothly changing surfaces (such as mountainous regions and architectural structures). Therefore, the feature extraction unit 14 extracts feature values based on the altitude texture distribution pattern that can distinguish the water regions 41 from the other smooth surfaces. Furthermore, the feature extraction unit 14 may extract a feature vector consisting of several statistic numbers based on the coefficients of the Curvelet transformation from which the time-frequency characteristics and local directionality information are acquired.

The segmentation unit 15 segments the three-dimensional topographical data into two parts, candidate water regions and non-water regions, using the feature vectors (feature values) extracted by the feature extraction unit 14.

To segment a region, first, the feature extraction unit 14 extracts a feature vector presenting the altitude distribution pattern of a region containing noise as a result of stereo matching error from any one water region 41 that the user has specified in the water region specifying unit 13.

Then, the segmentation unit 15 compares the feature vector of each point in the whole range of the three-dimensional topographical data with the feature vector of the water region 41 specified by the user. Then, the segmentation unit 15 segments the three-dimensional topographical data into two parts, candidate water regions and non-water regions, by determining that the point belongs to the candidate water region if the distance between the two vectors is approximately equal to or smaller than a given value, and otherwise determining that the point belongs to the non-water region.

The water region extraction unit 16 extracts a water region by extracting a connected component composed of points belonging to the candidate water region determined by the segmentation unit 15 and also with the same or wider area than a given threshold. More specifically, the water region extraction unit 16 firstly extracts connected regions by connecting points belonging to the candidate water region. Then, the water region extraction unit 16 regards a region having the same or wider area than a given threshold as a candidate water region among the extracted connected components. Then, if the candidate water region includes small non-water regions of which the area is equal to or smaller than a given fraction (for example, equal to or lower than 1/20) of the area of the surrounding candidate water region, the water region extraction unit 16 assumes the small non-water regions as noise and removes the small non-water regions. In other words, the water region extraction unit 16 converts the small non-water region to one part of the candidate water region.

The plane creation unit 17 creates a smooth plane presenting the exact altitude as a corrected water surface by analyzing the altitudes around the water region extracted by the water region extraction unit 16.

The above process makes it possible to reduce the influence of noise and acquire more precise three-dimensional topographical data. Finally the processed candidate water region is approved as a more precise water region.

Figure 4A:
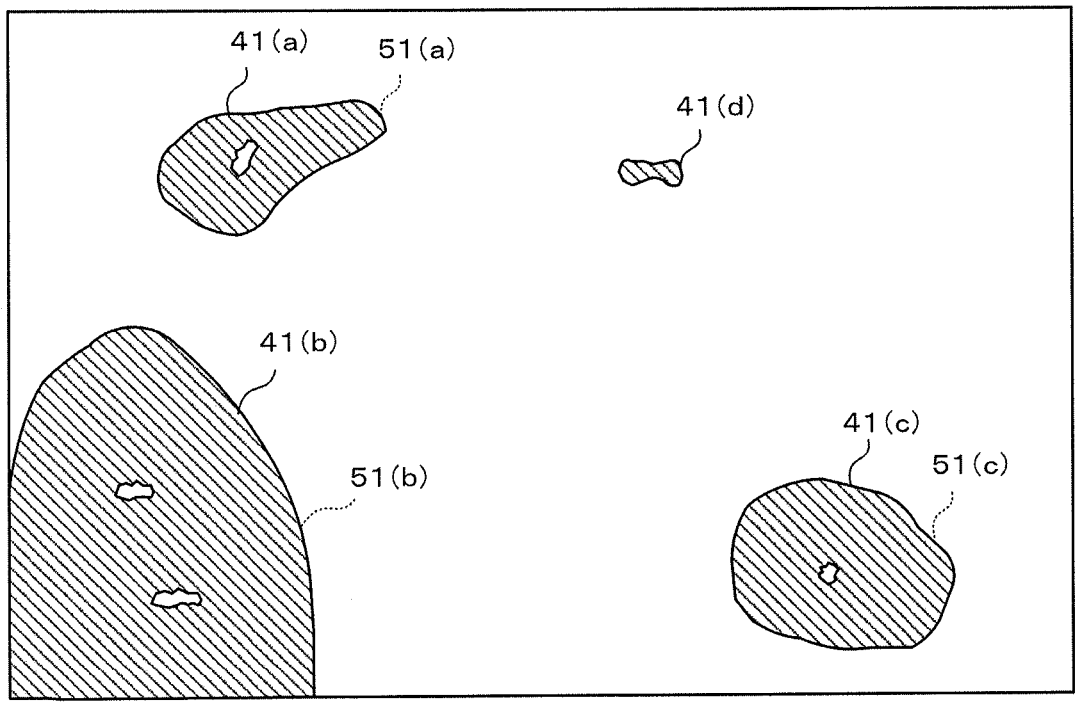
FIGS. 4A and 4B are illustrations for explaining exemplary processing by the segmentation unit and water region extraction unit.

FIG. 4 is an explanatory illustration showing an exemplary process by the segmentation unit 15, the water region extraction unit 16, and the plane creation unit 17. First, the segmentation unit 15 segments the three-dimensional topographical data in FIG. 2 into two parts, candidate water regions and non-water regions. Then, the water region extraction unit 16 extracts connected components having the same or wider area than a given threshold from the points belonging to the candidate water regions, whereby four regions 41(a), 41(b), 41(c), and 41(d) are obtained as shown in FIG. 4A. Then, the water region extraction unit 16 further extracts three regions 51(a) to 51(c) as candidate water regions since they have the same or wider area than a given threshold among the obtained regions 41(a) to 41(d).

Figure 4B:
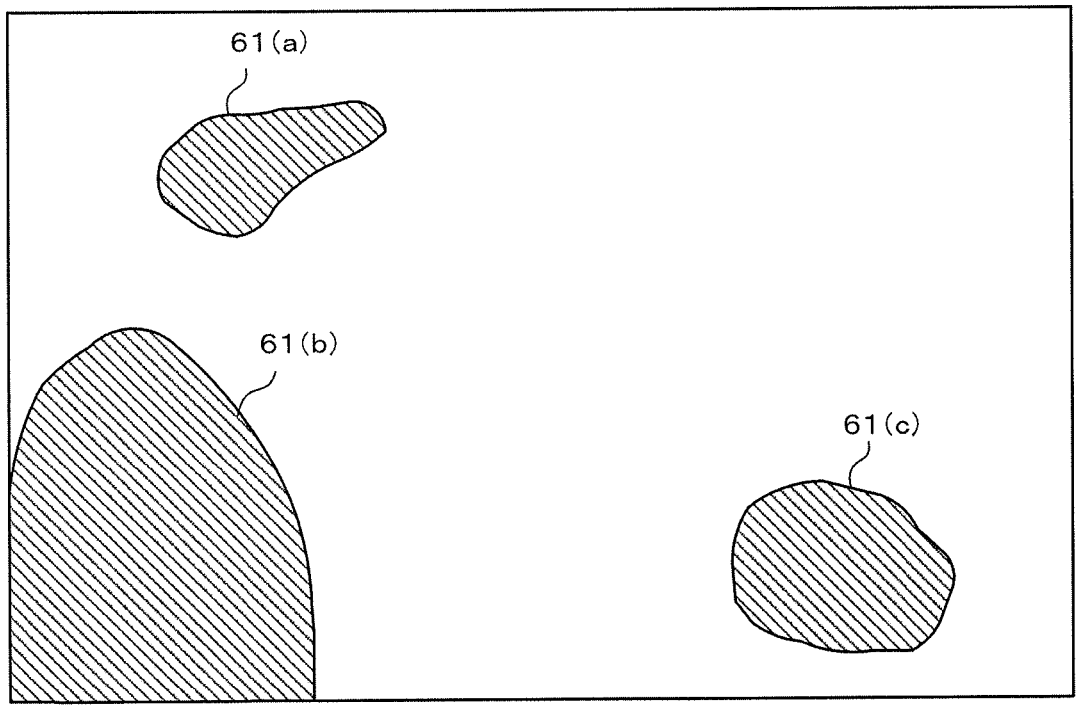

Then, the water region extraction unit 16 removes small non-water regions from the three candidate water regions 51(a) to 51(c), whereby regions 61(a) to 61(c) without non-water regions inside are extracted as water regions as shown in FIG. 4B.

Then, the plane creation unit 17 analyzes the altitudes around the water regions 61(a) to 61(c) extracted by the water region extraction unit 16, creates a smooth plane presenting the exact altitude as a corrected water surface for each, and fills (complements) the water regions 61(a) to 61(c) with each corrected water surface.

More specifically, the plane creation unit 17 first extracts the boundaries of the water regions 61(a) to 61(c) detected by the water region extraction unit 16. Then, since noise always occurs inside the water regions 61(a) to 61(c) due to matching errors, the noise is also likely to occur on the boundaries of the water regions 61(a) to 61(c); therefore, the plane creation unit 17 obtains corrected water surface coefficients (four coefficients of a plane equation presenting a plane in a three-dimensional space) based on the altitudes of a given range of non-water region outside the boundary instead of analyzing the altitude of each point on the boundary. For example, the plane creation unit 17 moves each point on the boundary to the outer direction of the water region by a given distance (like processing of extending a region) multiple times.

Here, each boundary point is moved (the region is extended) in the direction parallel to the normal line to the boundary at the point. Each point can be moved (the region can be extended) by step (by pixel), for example by three pixels per move (extension). Each time each point on the boundary is moved (the region is extended), the altitude at the new position corresponding to the point is recorded and a series of numeric values of the altitude are obtained after a given times of extension. Then, the average of the series of numeric values is used as the correct altitude of the original boundary point.

In the above process, four coefficients of a plane equation in a three-dimensional space $AX+BY+CZ=D$ are obtained by using the altitudes of the points on the boundary obtained by analyzing the altitudes of the non-water regions around the water regions 61(a) to 61(c) with the least-square method. In other words, the plane coefficients A, B, C, and D of the above equation presenting a plane in a three-dimensional space are calculated.

Figure 5:
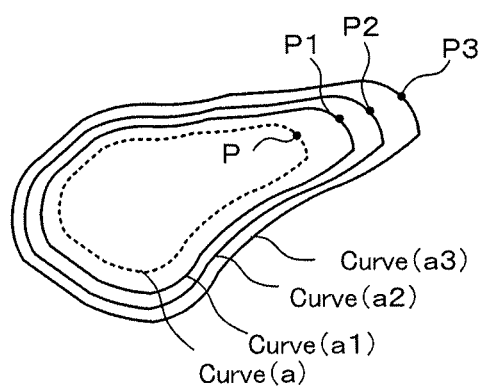
FIG. 5 is an illustration for explaining the extension of the boundary of a water region.

Then, a plane is created based on the plane coefficients and the inner region of the boundary is filled with the corrected water surface. For example, as shown in FIG. 5, a Curve (a) as the boundary of a water region is positioned at Curve (a1) after the first extension, positioned at Curve (a2) after the second extension, and positioned at Curve (a3) after the third extension. A point P on the Curve (a) is positioned at P1 on the Curve (a1) after the first extension, positioned at P2 on the Curve (a2) after the second extension, and positioned at P3 on the Curve (a3) after the third extension. When the coordinates of the points are expressed using a three-dimensional Cartesian coordinates (X, Y, Z), the coordinate Z presents the altitude of each point. The plane creation unit 17 uses the average of Z (P1), Z (P2), and Z (P3) as the altitude at the point P for creating a plane instead of the original value Z (P) in consideration for influence of noise on the boundary.

Strictly speaking, a water surface is not flat because of waves. However, there is presumably no significant influence on applications of topographical analysis even if water surfaces are modeled as planes in three-dimensional topographical data.

Figure 6:
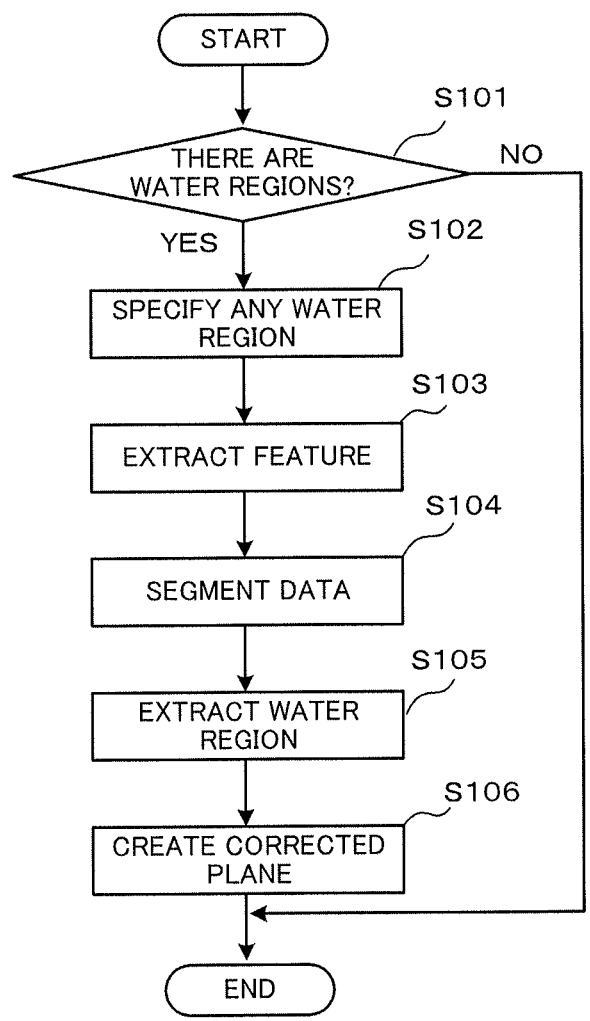
FIG. 6 is a flowchart for explaining the operation of the three-dimensional topological data precision improving device.

FIG. 6 is a flowchart for explaining the operation of the three-dimensional topographical data precision improving device 10. The operation of the three-dimensional topographical data precision improving device 10 will be described with reference to FIG. 6.

As three-dimensional topographical data are entered into the data input unit 11, the three-dimensional topographical data precision improving device 10 starts a series of processing shown in the flowchart of FIG. 6.

In the first Step S101, the determination unit 12 determines whether there is at least one water region in the entered three-dimensional topographical data. If there is at least one water region (Step S101; YES), the processing of Step S102 is executed. If there is no water region (Step S101; NO), the procedure ends with no further processing. The three-dimensional topographical data shown in FIG. 2 include multiple water regions 41, a mountainous region 42, and architectural structures 43. Therefore, as the three-dimensional topographical data of FIG. 2 are entered, the determination unit 12 determines that there are some water regions (Step S101; YES).

In the Step S102 following the Step S101, the water region specifying unit 13 specifies any one water region in the entered three-dimensional topographical data.

Here, it is possible that the user determines whether there is any water region in the Step S101. Furthermore, it is possible that the user specifies the range of any water region in the Step S102.

In Step S103 following the Step S102, the feature extraction unit 14 extracts a feature vector (feature value) presenting the altitude distribution pattern around each point in the three-dimensional topographical data entered through the data input unit 11. For example, the feature extraction unit 14 extracts a feature vector of altitude distribution that can distinguish the regions with different altitude texture distribution patterns.

In Step S104 following the Step S103, the segmentation unit 15 compares the feature vector of each point in the three-dimensional topographical data with the feature vector of the specified water regions extracted in the Step S103. Then, the segmentation unit 15 divides the three-dimensional topographical data into candidate water regions and non-water regions by determining whether each point belongs to the candidate water region or to the non-water region. More specifically, the segmentation unit 15 divides the three-dimensional topographical data into two parts, candidate water regions and non-water regions by determining that one point belongs to the candidate water region if the distance between the two vectors is approximately equal to or smaller than a given value, and otherwise determining that the point belongs to the non-water region.

In Step S105 following the Step S104, the water region extraction unit 16 connects the points belonging to the candidate water region and detects the connected component having the same or wider area than a given threshold as a water region. More specifically, the water region extraction unit 16 first extracts a connected component defined by connecting the points belonging to the candidate water region. Then, the water region extraction unit 16 detects regions having the same or wider area than a given threshold as candidate water regions among the extracted connected components.

In Step S106 following the Step S105, the plane creation unit 17 extends the boundary of each water region to the outer direction of the water region several times and obtains the altitudes at new points (locations) resulting from moving each point on the boundary. Then, the plane creation unit 17 creates a corrected plane presenting the water surface of the water region by using the average value of the altitudes on new points as the altitude of the original boundary point, and fills up (complements) the region inside the boundary with the corrected plane.

As described above, in this embodiment, the three-dimensional topographical data are segmented into candidate water regions and non-water regions based on the feature vectors presenting the altitude distribution pattern. Then, a candidate water region that is a connected component having the same or wider area than a given threshold is extracted as a water region, the boundary of the water region is extended to the outer direction, and a corrected plane of the water region is created based on the altitudes of non-water regions surrounding the water region. Consequently, the inside of the water region is presented as a smooth plane. Therefore, the precision of the three-dimensional topographical data is improved.

Here, in this embodiment, as seen with reference to FIG. 2 or FIG. 4, there are three water regions within the range of the three-dimensional topographical data. However, this is not restrictive and there may be one or more water regions or may be no water region according to the actual geography.

Furthermore, in this embodiment, when the boundary of a water region is extended to the outer direction, altitude information around the water region at the positions extended by each boundary pixel is obtained and the coefficients of a corrected plane of the water region are calculated from the above altitude information. This is not restrictive and sampling points can be used, for example, points obtained by setting equal intervals on the boundary. Also in such a case, under certain limit of sampling interval, the precision is assured and the use of sampling points at equal intervals improves the processing speed. Therefore, eventually, it is also possible to obtain the coefficients of a corrected plane of the water region and create a corrected place.

Furthermore, in this embodiment, the boundary of a water region is extended to the outer direction step by step by three pixels per extension. This is not restrictive and the boundary can be extended by four or more pixels per extension when the altitude data around the water region do not largely change and the three-dimensional topographical data are of a significantly high resolution and therefore the actual distance between adjacent pixels is significantly small, for example 2 cm.

Furthermore, the boundary can be extended by two or fewer pixels per extension when, for example, the altitude data around the water region largely change or the three-dimensional topographical data are of a low resolution and therefore the actual distance between adjacent pixels is large, which means that the extension by one pixel covers a wide range.

Furthermore, in this embodiment, as seen with reference to FIG. 5, the boundary of a water region is extended to the outer direction three times, and the altitude at each point on the boundary is calculated from that of the points on extended boundary Curves (a1) to (a3). This is not restrictive and the boundary can be extended four or more times when the altitude data around the water region do not largely change and the three-dimensional topographical data are of a significantly high resolution and therefore the actual distance between adjacent pixels is significantly small, for example 2 cm. Furthermore, the boundary can be extended two or fewer times when, for example, the altitude data around the water region largely change or the three-dimensional topographical data are of a low resolution and therefore the actual distance between adjacent pixels is large, which means that the extension by one pixel covers a wide range.

Furthermore, in this embodiment, the three-dimensional topographical data are obtained by stereo matching on a pair of stereoscopic aerial photographs acquired by photographing the same spot from different viewpoints. This is not restrictive and the stereoscopic photographs for stereo matching can be images formed by digitalizing satellite photographs.

Furthermore, in this embodiment, the feature vector created based on the coefficients of the Curvelet transformation are used to describe the altitude distribution pattern of each point in three-dimensional topographical data. However, this is not restrictive and any other related method, for example the coefficients of the Wavelet transformation, can be used.

Furthermore, the three-dimensional topographical data precision improving device 10 of this embodiment can be realized by a general-purpose computer.

Figure 7:
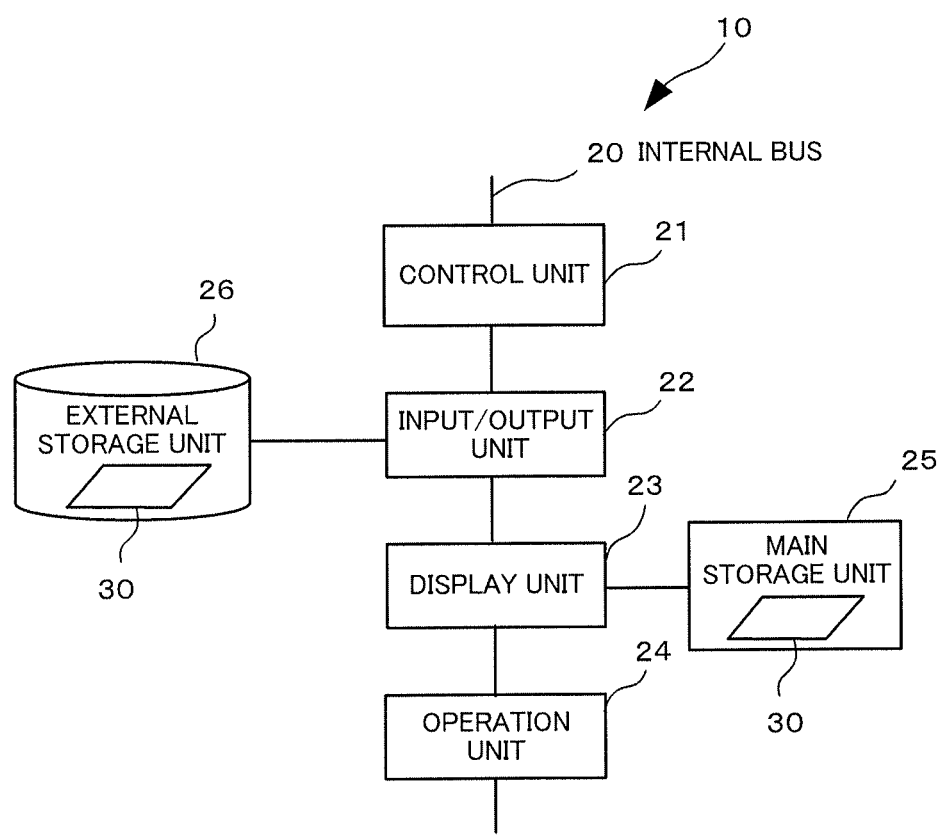
FIG. 7 is a block diagram showing an exemplary physical configuration for realizing the three-dimensional topological data precision improving device using a computer.

FIG. 7 is a block diagram showing an exemplary physical configuration for realizing the three-dimensional topographical data precision improving device 10 using a computer.

The three-dimensional topographical data precision improving device 10 realized by a computer comprises, as shown in FIG. 7, a control unit 21, an input/output unit 22, a display unit 23, an operation unit 24, a main storage unit 25, and an external storage unit 26.

The input/output unit 22, the display unit 23, the operation unit 24, the main storage unit 25, and the external storage unit 26 are all connected to the control unit 21 via an internal bus 20.

The control unit 21 is composed of a CPU (central processing unit) or the like and executes the three-dimensional topographical data precision improving procedure according to a control program 30 stored in the external storage unit 26.

The input/output unit 22 is composed of a wireless transmitter/receiver, a wireless modem or network terminal device, and a serial interface or LAN (local area network) interface connected to them. Three-dimensional topographical data are received and precision improvement results are transmitted via the input/output unit 22.

The display unit 23 is composed of a CRT (cathode ray tube) or LCD (liquid crystal display) or the like, and displays input three-dimensional topographical data, water region ranges, and precision improved three-dimensional topographical data results.

The operation unit 24 is composed of a pointing device such as a keyboard and mouse, and an interface device connecting the pointing device such as a keyboard and mouse to the internal bus 20. Three-dimensional topographical data, transmission/reception instruction, and processing results displaying instruction are entered via the operation unit 24 and supplied to the control unit 21.

The main storage unit 25 is composed of a RAM (random access memory) or the like, loads the control program 30 stored in the external storage unit 26 and supplies it to the control unit 21, and is used as the work area of the control unit 21.

The external storage unit 26 is composed of a nonvolatile memory such as a flash memory, hard disk, and DVD-RAM (digital versatile disk random access memory), stores the control program 30 for the control unit 21 to execute the above-described procedure in advance. The control program 30 supplies the processing data stored in the external storage unit 26 to the control unit 21 according to instructions from the control unit 21, and stores data obtained from the control unit 21 to the external storage unit 26. , supplies the processing data stored by the control program 30 to the control unit 21 according to instructions from the control unit 21, and stores data obtained from the control unit 21.

The processing of the feature extraction unit 14, the segmentation unit 15, the water region extraction unit 16, and the plane creation unit 17 of the three-dimensional topographical data precision improving device 10 shown in FIG. 1 is executed as the control program 30 conducts processing using the control unit 21, the input/output unit 22, the display unit 23, the operation unit 24, the main storage unit 25, and the external storage unit 26 as resources.

In addition, the above-described hardware configuration and flowchart are given by way of example and any change and modification can be made.

The core unit for executing the processing of the three-dimensional topographical data precision improving device 10 can be realized by a conventional computer system instead of a dedicated system. For example, computer programs for executing the above-described operations can be stored and distributed on a computer-readable recording medium (a flexible disk, CD-ROM, DVD-ROM, etc), and installed on a computer to configure the three-dimensional topographical data precision improving device 10 executing the above-described procedure. Alternatively, the computer programs can be stored in a storage device of a server unit on a communication network such as the Internet and downloaded on a conventional computer system to configure the three-dimensional topographical data precision improving device 10.

Furthermore, when the functions of the three-dimensional topographical data precision improving device 10 are realized by apportionment between an OS (operation system) and application programs or cooperation of an OS and application programs, it is possible to only store the application programs on a recording medium or in a storage device.

Furthermore, the computer programs can be superimposed on carrier waves to distribute them via a communication network. For example, the computer programs can be posted on a bulletin board system (BBS) of a communication network to distribute them via the network. Then, the computer programs can be activated and executed in a manner similar to other application programs under the control of an OS so that the above-described procedure is executed.

The above embodiment is partially or entirely described as in the following supplementary notes, but not limited thereto.

(Supplementary Note 1)

A three-dimensional topographical data precision improving device removing noise that occurs in water regions of three-dimensional topographical data as a result of stereo matching errors upon three-dimensional information calculation in three-dimensional topographical data established from stereoscopic photographs, comprising:

a determination unit determining whether there are any water regions in the input three-dimensional topographical data;

a water region specifying unit specifying the range of any one water region;

a feature extraction unit extracting feature values within the specified one water region by extracting feature values describing the altitude distribution pattern of each local region over the whole range of the three-dimensional topographical data;

a segmentation unit segmenting the points in the three-dimensional topographical data into candidate water regions and non-water regions by using the extracted feature values within the specified water region as a water region determination reference value, comparing the feature values of each point in the three-dimensional topographical data with the water region determination reference value, and determining that the point belongs to the candidate water region if the difference is equal to or smaller than a given threshold, and otherwise determining that the point belongs to the non-water region;

a water region extraction unit extracting a connected component having the same or wider area than a given threshold among the candidate water regions as a water region based on the results of the segmentation unit; and a plane creation unit creating a corrected plane joined to the boundary of each water region extracted by the water region extraction unit using the altitudes of the surrounding non-water regions adjoining to the water region extracted by the water region extraction unit, and replacing the water region extracted by the water region extraction unit with the corrected plane.

(Supplementary Note 2)

The three-dimensional topographical data precision improving device according to Supplementary note 1, wherein:

the plane creation unit extends the boundary of each water region extracted by the water region extraction unit to the outer direction from the original position, and creates a corrected plane of the water region based on the altitudes of the surrounding non-water region at the extended positions.

(Supplementary Note 3)

The three-dimensional topographical data precision improving device according to Supplementary note 1 or 2, wherein:

the feature extraction unit extracts feature values to distinguish water region and non-water region based on the fact of the difference in altitude texture distribution pattern of the water region and that of non-water region.

(Supplementary Note 4)

The three-dimensional topographical data precision improving device according to Supplementary note 1 or 2, wherein:

the feature extraction unit extracts feature values within the water region based on the coefficients of the Curvelet transformation.

(Supplementary Note 5)

A three-dimensional topographical data precision improving method removing noise that occurs in water regions of three-dimensional topographical data as a result of stereo matching errors upon three-dimensional information calculation in three-dimensional topographical data established from stereoscopic photographs, comprising:

a determination step of determining whether there are any water regions in the input three-dimensional topographical data;

a water region specifying step of specifying the range of any one water region;

a feature extraction step of extracting feature values within the specified one water region by extracting feature values describing the altitude distribution pattern of each local region over the whole range of the three-dimensional topographical data;

a segmentation step of segmenting the points in the three-dimensional topographical data into candidate water regions and non-water regions by using the extracted feature values within the specified water region as a water region determination reference value, comparing the feature values of each point in the three-dimensional topographical data with the water region determination reference value, and determining that the point belongs to the candidate water region if the difference is equal to or smaller than a given threshold, and otherwise determining that the point belongs to the non-water region;

a water region extraction step of extracting a connected component having the same or wider area than a given threshold among the candidate water regions as a water region based on the results in the segmentation step; and a plane creation step of creating a corrected plane joined to the boundary of each water region extracted in the water region extraction step using the altitudes of the surrounding non-water regions adjoining to the water region extracted in the water region extraction step, and replacing the water region extracted in the water region extraction step with the corrected plane.

(Supplementary Note 6)

The three-dimensional topographical data precision improving method according to Supplementary note 5, wherein:

the plane creation step consists of extending the boundary of each water region extracted in the water region extraction step to the outer direction from the original position, and creating a corrected plane of the water region based on the altitudes of the surrounding non-water region at the extended positions.

(Supplementary Note 7)

A computer-readable recording medium on which a program is recorded according to a third exemplary aspect of the present invention records a program allowing a computer removing noise that occurs in water regions of three-dimensional topographical data as a result of stereo matching errors upon three-dimensional information calculation in three-dimensional topographical data established from stereoscopic photographs to function as:

a determination unit determining whether there are any water regions in the input three-dimensional topographical data;

a water region specifying unit specifying the range of any one water region;

a feature extraction unit extracting feature values within the specified one water region by extracting feature values describing the altitude distribution pattern of each local region over the whole range of the three-dimensional topographical data;

a segmentation unit segmenting the points in the three-dimensional topographical data into candidate water regions and non-water regions by using the extracted feature values within the specified water region as a water region determination reference value, comparing the feature values of each point in the three-dimensional topographical data with the water region determination reference value, and determining that the point belongs to the candidate water region if the difference is equal to or smaller than a given threshold, and otherwise determining that the point belongs to the non-water region;

a water region extraction unit extracting a connected component having the same or wider area than a given threshold among the candidate water regions as a water region based on the results of the segmentation unit; and a plane creation unit creating a corrected plane joined to the boundary of each water region extracted by the water region extraction unit using the altitudes of the surrounding non-water regions adjoining to the water region extracted by the water region extraction unit, and replacing the water region extracted by the water region extraction unit with the corrected plane.

(Supplementary Note 8)

The computer-readable recording medium on which a program is recoded according to Supplementary note 7, wherein when the computer functions as the plane creation unit, the plane creation unit extends the boundary of each water region extracted by the water region extraction unit to the outer direction from the original position, and creates a corrected plane of the water region based on the altitudes of the surrounding non-water region at the extended positions.

The present invention is not confined to the above embodiment of the present invention and explanation thereof in any way. Various embodiments easily anticipated by a person of ordinary skill in the field will fall within the present invention.

This application is based on Japanese Patent Application No. 2010-092773, filed on Apr. 14, 2010, and incorporates the specification, scope of claims, and drawings thereof. The entire disclosure of the above Japanese Patent Application is incorporated herein by reference.

INDUSTRIAL APPLICABILITY

The three-dimensional topographical data precision improving device, three-dimensional topographical data precision improving method, and recording medium of the present invention are useful for removing noise that occurs in water regions as a result of stereo matching errors upon three-dimensional information calculation in three-dimensional topographical data established from stereoscopic photographs.

LEGEND DESCRIPTION

10 Three-dimensional topographical data precision improving device
11 Data input unit
12 Determination unit
13 Water region specifying unit
14 Feature extraction unit
15 Segmentation unit
16 Water region extraction unit
17 Plane creation unit
18 Display unit
19 Command input unit
20 Internal bus
21 Control unit
22 Input/output unit
23 Display unit
24 Operation unit
25 Main storage unit
26 External storage unit
30 Control program
41, 41(a) to 41(d) Water region
42 Mountainous region
43 Architectural structure
51, 51(a) to 51(c) Candidate water region
61, 61(a) to 61(c) Water region

The invention claimed is:

1. A three-dimensional topographical data precision improving device removing noise that occurs in water regions of three-dimensional topographical data as a result of stereo matching errors upon three-dimensional information calculation in three-dimensional topographical data established from stereoscopic photographs, comprising:

a memory device configured to store data and program code;

a processor configured to access the memory and cause control of:

a determination unit determining whether there are any water regions in the input three-dimensional topographical data;

a water region specifying unit specifying the range of any one water region;

a feature extraction unit extracting feature values on each point in the three-dimensional topographical data based on altitude distribution pattern in the local region of the each point, and extracting feature values within the specified one water region;

a segmentation unit segmenting the points in the three-dimensional topographical data into candidate water regions and non-water regions by using the extracted feature values within the specified water region as a water region determination reference value, comparing the feature values of each point in the three-dimensional topographical data with the water region determination reference value, and determining that the point belongs to the candidate water region if the difference is equal to or smaller than a given threshold, and otherwise determining that the point belongs to the non-water region;

a water region extraction unit extracting a connected component having the same or wider area than a given threshold among the candidate water regions as a water region based on the results of the segmentation unit; and a plane creation unit creating a corrected plane joined to the boundary of each water region extracted by the water region extraction unit using the altitudes of the surrounding non-water regions adjoining to the water region extracted by the water region extraction unit, and replacing the water region extracted by the water region extraction unit with the corrected plane.

2. The three-dimensional topographical data precision improving device according to claim 1, wherein:

the plane creation unit extends the boundary of each water region extracted by the water region extraction unit to the outer direction from the original position, and creates a corrected plane of the water region based on the altitudes of the surrounding non-water region at the extended positions.

3. The three-dimensional topographical data precision improving device according to claim 1, wherein:

the feature extraction unit extracts feature values to distinguish water region and non-water region based on the fact of the difference in altitude texture distribution pattern of the water region and that of non-water region.

4. The three-dimensional topographical data precision improving device according to claim 1, wherein:

the feature extraction unit extracts feature values within the water region based on the coefficients of the Curvelet transformation.

5. A three-dimensional topographical data precision improving method removing noise that occurs in water regions of three-dimensional topographical data as a result of stereo matching errors upon three-dimensional information calculation in three-dimensional topographical data established from stereoscopic photographs, comprising:

a determination step of determining whether there are any water regions in the input three-dimensional topographical data;

a water region specifying step of specifying the range of any one water region;

a feature extraction step of extracting feature values on each point in the three-dimensional topographical data based on altitude distribution pattern in the local region of the each point, and extracting feature values within the specified one water region;

a segmentation step of segmenting the points in the three-dimensional topographical data into candidate water regions and non-water regions by using the extracted feature values within the specified water region as a water region determination reference value, comparing the feature values of each point in the three-dimensional topographical data with the water region determination reference value, and determining that the point belongs to the candidate water region if the difference is equal to or smaller than a given threshold, and otherwise determining that the point belongs to the non-water region;

a water region extraction step of extracting a connected component having the same or wider area than a given threshold among the candidate water regions as a water region based on the results in the segmentation step; and a plane creation step of creating a corrected plane joined to the boundary of each water region extracted in the water region extraction step using the altitudes of the surrounding non-water regions adjoining to the water region extracted in the water region extraction step, and replacing the water region extracted in the water region extraction step with the corrected plane.

6. The three-dimensional topographical data precision improving method according to claim 5, wherein:

the plane creation step consists of extending the boundary of each water region extracted in the water region extraction step to the outer direction from the original position, and creating a corrected plane of the water region based on the altitudes of the surrounding non-water region at the extended positions.

7. A non-transitory computer-readable recording medium on which a program is recorded according to a third exemplary aspect of the present invention records a program allowing a computer removing noise that occurs in water regions of three-dimensional topographical data as a result of stereo matching errors upon three-dimensional information calculation in three-dimensional topographical data established from stereoscopic photographs to function as:

a determination unit determining whether there are any water regions in the input three-dimensional topographical data;

a water region specifying unit specifying the range of any one water region;

a feature extraction unit extracting feature values on each point in the three-dimensional topographical data based on altitude distribution pattern in the local region of the each point, and extracting feature values within the specified one water region;

a segmentation unit segmenting the points in the three-dimensional topographical data into candidate water regions and non-water regions by using the extracted feature values within the specified water region as a water region determination reference value, comparing the feature values of each point in the three-dimensional topographical data with the water region determination reference value, and determining that the point belongs to the candidate water region if the difference is equal to or smaller than a given threshold, and otherwise determining that the point belongs to the non-water region;

a water region extraction unit extracting a connected component having the same or wider area than a given threshold among the candidate water regions as a water region based on the results of the segmentation unit; and a plane creation unit creating a corrected plane joined to the boundary of each water region extracted by the water region extraction unit using the altitudes of the surrounding non-water regions adjoining to the water region extracted by the water region extraction unit, and replacing the water region extracted by the water region extraction unit with the corrected plane.

8. The non-transitory computer-readable recording medium on which a program is recoded according to claim 7, wherein when the computer functions as the plane creation unit, the plane creation unit extends the boundary of each water region extracted by the water region extraction unit to the outer direction from the original position, and creates a corrected plane of the water region based on the altitudes of the surrounding non-water region at the extended positions.

* * * * *